United States Patent [19]
Karita et al.

[11] Patent Number: 5,274,470
[45] Date of Patent: Dec. 28, 1993

[54] DATA CONVERTER AND IMAGE READER USING THE SAME

[75] Inventors: Toshiaki Karita, Sakurai; Ichizo Masuda, Yamatokouriyama, both of Japan

[73] Assignee: Sharp Kabushiki Kaisha, Osaka, Japan

[21] Appl. No.: 566,894

[22] Filed: Aug. 14, 1990

Related U.S. Application Data

[63] Continuation of Ser. No. 250,748, Sep. 29, 1988, abandoned.

[30] Foreign Application Priority Data

Sep. 30, 1987 [JP] Japan ................ 62-247627

[51] Int. Cl.$^5$ .............................................. H04N 1/40
[52] U.S. Cl. ................................................... 358/448
[58] Field of Search ............... 358/434, 435, 436, 437, 358/438, 439, 448, 447

[56] References Cited

U.S. PATENT DOCUMENTS

| 4,240,117 | 12/1980 | Wellendorf et al. ........... 358/296 |
| 4,296,441 | 10/1981 | Ogasawara ....................... 250/578 |
| 4,398,221 | 8/1983 | Yamaguchi ....................... 358/280 |
| 4,422,153 | 12/1983 | Arai et al. ........................ 358/60 |
| 4,467,348 | 8/1984 | Fujii ................................. 358/280 |

FOREIGN PATENT DOCUMENTS

| 0069325 | 1/1983 | European Pat. Off. . |
| 2385112 | 10/1978 | France . |
| 2148071 | 5/1985 | United Kingdom . |

OTHER PUBLICATIONS

Bluethman; Output of Non-Coded Information in Vertical Scanning; Feb. 1979; vol. 21, No. 9; pp. 3473-3478, IBM Technical Disclosure Bulletin.

*Primary Examiner*—Edward L. Coles, Sr.
*Assistant Examiner*—Jerome Grant, II

[57] ABSTRACT

A data converter is provided with arranged in a parallel manner such that each has a storage capacity for plurality of bits. A counter counts clock pulses and supplies a signal representing the counting results to a decoder, which in turn supplies loading pulses to respective shift registers. The shift registers received in a parallel manner a plurality of serial bit data in response to the loading pulses and internally transfer the storage contents bit by bit in response to transfer signals, so that the data read from the shift registers are outputted through an output control gate.

15 Claims, 9 Drawing Sheets

FIG. 4

| | | | | | | | | |
|---|---|---|---|---|---|---|---|---|
| 000H | M(1,1) | M(2,1) | M(3,1) | M(4,1) | M(5,1) | M(6,1) | M(7,1) | M(8,1) |
| 100H | M(1,2) | M(2,2) | M(3,2) | M(4,2) | M(5,2) | M(6,2) | M(7,2) | M(8,2) |
| 200H | M(1,3) | M(2,3) | M(3,3) | M(4,3) | M(5,3) | M(6,3) | M(7,3) | M(8,3) |
| 300H | M(1,4) | M(2,4) | M(3,4) | M(4,4) | M(5,4) | M(6,4) | M(7,4) | M(8,4) |
| 400H | M(1,5) | M(2,5) | M(3,5) | M(4,5) | M(5,5) | M(6,5) | M(7,5) | M(8,5) |
| 500H | M(1,6) | M(2,6) | M(3,6) | M(4,6) | M(5,6) | M(6,6) | M(7,6) | M(8,6) |
| 600H | M(1,7) | M(2,7) | M(3,7) | M(4,7) | M(5,7) | M(6,7) | M(7,7) | M(8,7) |
| 700H | M(1,8) | M(2,8) | M(3,8) | M(4,8) | M(5,8) | M(6,8) | M(7,8) | M(8,8) |

+0H

+1H  M(9,1) .... .... M(9,8)

+FFH  M(2048,1) .... .... M(2048,8)

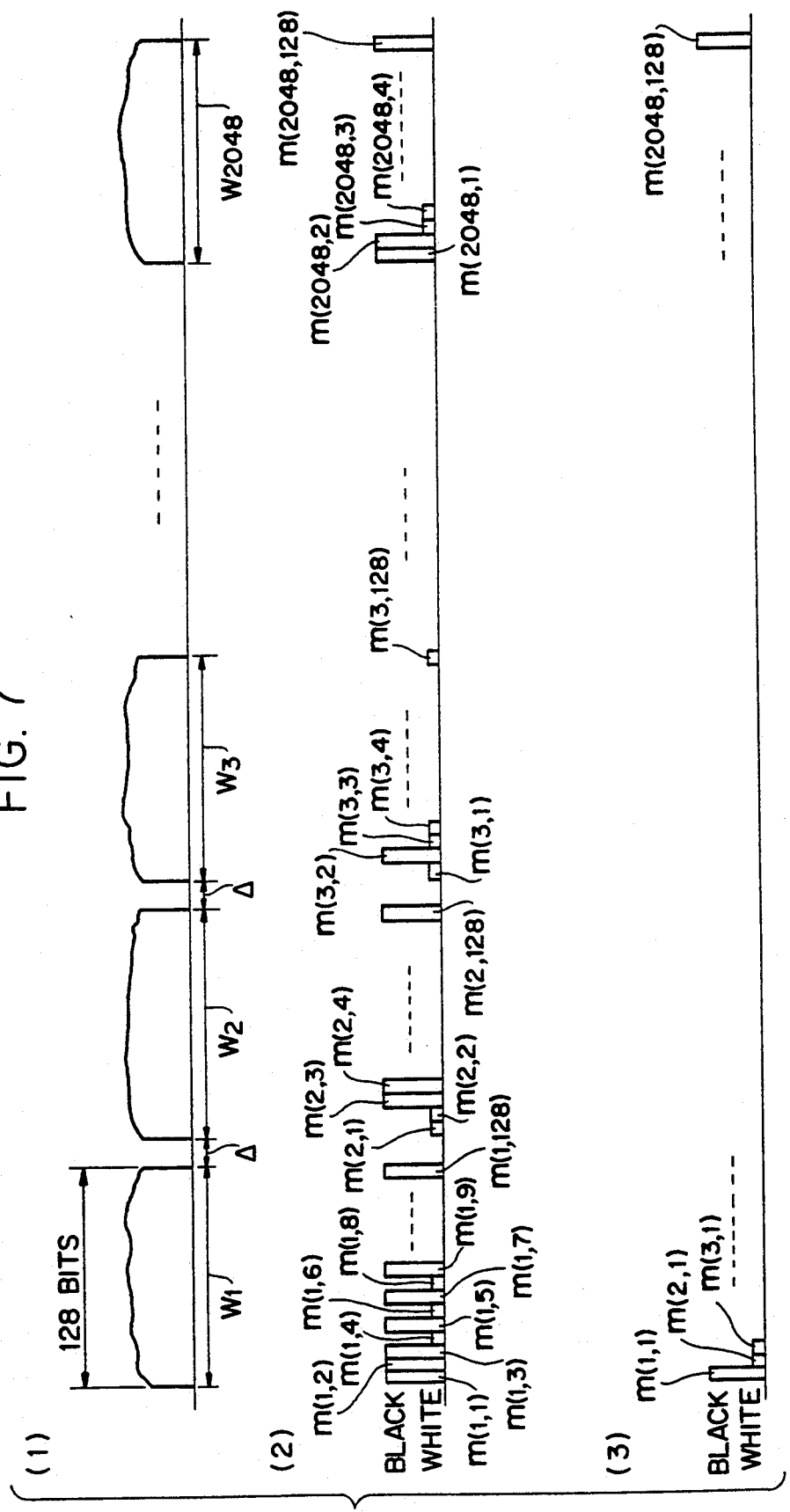

DATA CONVERTER AND IMAGE READER USING THE SAME

This application is a continuation of application Ser. No. 07/250,748 filed on Sep. 29, 1988, now abandoned.

BACKGROUND OF THE INVENTION

1. Field of the Invention

The present invention relates to a data converter and an image reader using the same data. More specifically, it relates to a data converter which is applied to a facsimile, an image scanner or the like to convert read image data and an image reader using the same data.

2. Description of the Prior Art

In a facsimile, for example, an original image is read pixel by pixel. A reading sensor, such as a one-dimensional CCD (charge coupled device), performs main scanning and subscanning from left to right and from top to bottom along the surface of the original. Thereby the original image is read over the entire surface. In case of recording, a recording head such as a thermal head performs similar scanning with respect to recording paper. Such a scanning method is set by the so-called G3 standard in the facsimile.

A facsimile of the so-called serial system has come into use in recent years. In such a facsimile of the serial system, a reading sensor having a plurality of pixels along the subscanning direction in the G3 standard mechanically moves along the main scanning direction. After such a single movement, the reading sensor is moved in the subscanning direction in a distance corresponding to the number of pixels thereof, for reading an original image. Furthermore, in the facsimile of the serial system, a recording head also has a plurality of pixels along the subscanning direction in the G3 standard similar to the reading sensor, and performs the recording by scanning recording paper in a similar manner to the reading sensor, The aforementioned facsimile of the serial system has been widely used in recent years, since the pixel numbers of the reading sensor and the recording head can be decreased to reduce the cost. For example, although a device having 2048 pixels is required for a reading sensor or a recording head which electrically performs the main scanning along the G3 standard, such a device may have only 64 to 128 pixels in the serial system.

In a facsimile, a transmitted image cannot be reproduced in a receiving area unless the order of transmission of image information is unified. The aforementioned G3 standard is adapted to unify such order.

In the facsimile of the serial system, conversion is required in order to transpose the order of image data for transmission/receiving since the scanning method thereof is absolutely different from that along the G3 standard. Such a conversion of the image data is performed in so-called hardware manner by various types of arithmetic circuits or in a so-called software manner by a CPU (central processing unit).

In the aforementioned method of converting image data in the hardware manner, complicated circuit structure having an extremely large scale is required in order to cope with the main scanning length and the pixel number of the facsimile in a counterpart as well as coping with a variation in the main scanning length. On the other hand, in the method of converting image data in the software manner, the processing speed of the CPU becomes a factor since pixel-by-pixel processing, i.e., bitwise processing, cannot be performed at a high speed although processing in units of eight or 16 bits may be quickly performed. When the CPU is implemented by a Z80 to receive basic clocks at a frequency of 6 MHz, for example, about 25 msec. is required for each scanning line. This is the time limit in consideration for image processing operations such as compression or expansion.

SUMMARY OF THE INVENTION

Accordingly, a principal object of the present invention is to provide a data converter which can increase the processing speed with a small scale circuit structure.

Another object of the present invention is to provide an image reader using a data converter whose processing speed is increased with a small scale circuit structure.

Briefly stated, a plurality of bit-serial data are parallelly inputted in a plurality of storage/transfer devices each having a plurality of bits of storage capacity in response to input signals. The storage contents are transferred bit by bit in response to transfer signals, and output a plurality of bits of data parallelly read from the respective storage/transfer devices.

Therefore according to the present invention, data stored in a plurality of storage/transfer devices having matrix ordering can be subjected to arrangement/arithmetic processing at a high speed. Thus, the processing speed for data conversion can be improved while such data conversion can be implemented through a small scale circuit structure.

In an inventive image reader using a data converter, an image reading device provided with a plurality of sensors arranged in a first direction sequentially scans the surface of an original along a second direction which is perpendicular to the first direction. The device is then moved in the first direction to again sequentially scan the original along the second direction and sequentially output a plurality of bits of image read data per scanning in the second direction. Thereby, the data converter converts the outputted image read data to output the same data.

According to the present invention, therefore, a data converter having a small scale circuit structure with a high processing speed can be applied to an image reader such as a facsimile or an image scanner.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram for illustrating a mode of storage in a transmission memory shown in FIG. 1;

FIG. 7 illustrates signals derived in respective parts of the facsimile.

DESCRIPTION OF THE PREFERRED EMBODIMENT

Figure 1:
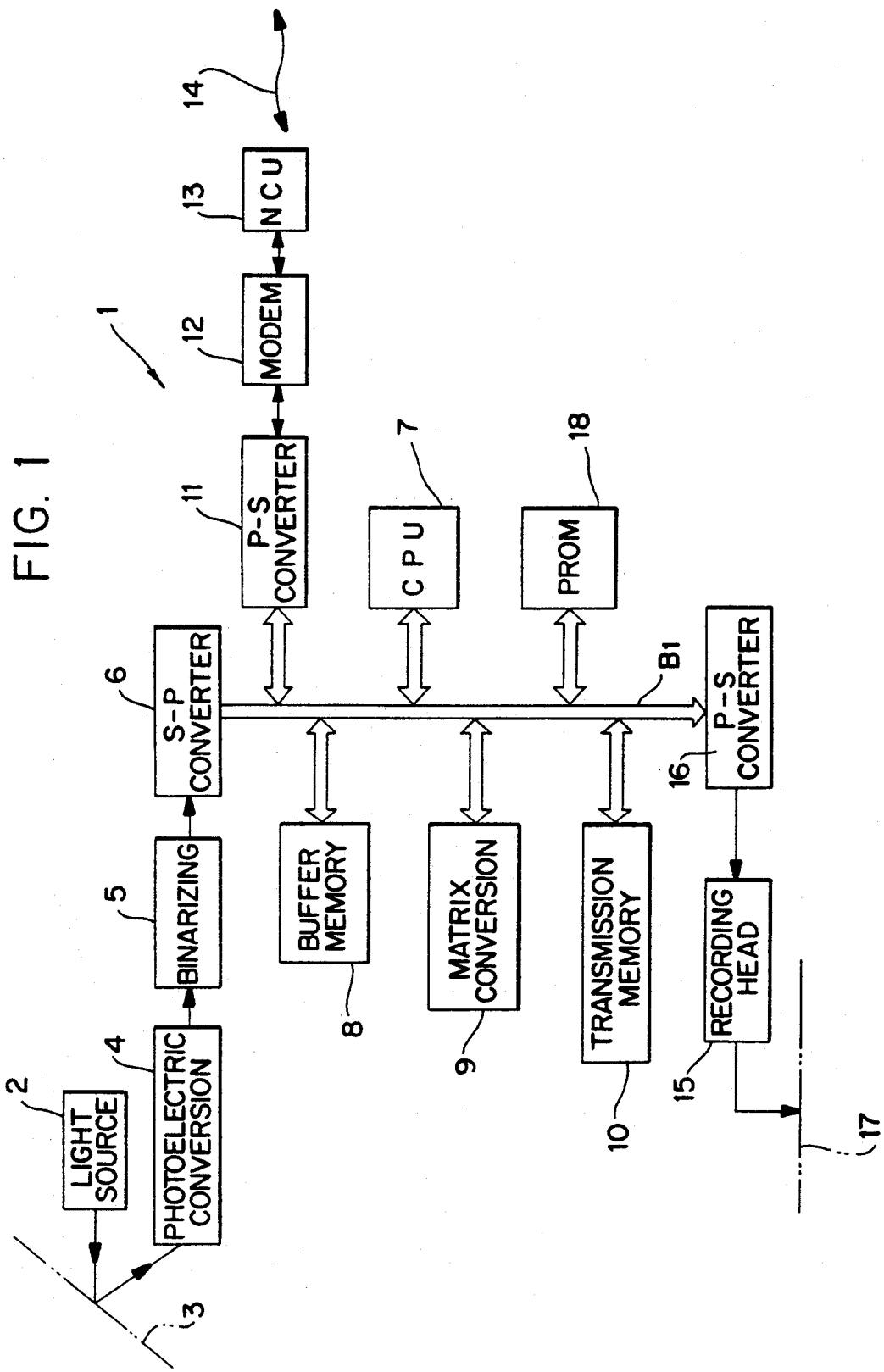
FIG. 1 is a block diagram showing basic structure of a facsimile according to an embodiment of the present invention.

FIG. 1 is a block diagram showing the basic structure of a facsimile 1 according to an embodiment of the present invention. Light emitted from a light source 2 is applied to the surface of an original 3, so that scattered light from the original surface is applied to a photoelectric conversion element 4, which is implemented by a one-dimensional CCD (charge coupled device) or the like for reading the original 3 in the serial system. The photoelectric conversion element 4 outputs a signal whose level corresponds to the intensity of the applied light, i.e., a signal whose level corresponds to the luminance of the read pixel, for supplying the same signal to a binarizing circuit 5. The binarizing circuit 5 determines whether the pixel actually read is a black pixel or a white pixel on the basis of the level of the supplied signal. In other words, the binarizing circuit 5 creates one-bit of data "1" or "0". Thus, the binarizing circuit 5 assigns the data "1" or "0" to the read pixel.

The output from the binarizing circuit 5 is supplied to a serial-to-parallel converter (hereinafter referred to as "S-P converter") 6, for converting the output into 8-bit data, for example. The 8-bit data is supplied to a buffer memory 8 through a data bus B1 under the control of a CPU (central processing unit) 7, for storing the same data. The CPU 7 is adapted to control respective parts of the facsimile 1, transfer data, etc. on the basis of programs that one stored in a PROM (programmable read only memory) 18.

The buffer memory 8 sequentially stores image data in the aforementioned manner, while the CPU 7 simultaneously retrieves image data already stored in the buffer memory 8, for supplying the same data to a matrix conversion circuit 9. The matrix conversion circuit 9 converts the image data as hereinafter described, and supplies the converted data to a transmission memory 10. The data supplied to the transmission memory 10 are sequentially retrieved at a speed which is determined by the transmission rate for data transmission through a telephone line 14, and the data is supplied to a parallel-to-serial converter (hereinafter referred to as "P-S converter") 11 for converting to be converted into serial data. The serialized data are modulated by a modem 12, and transmitted to a receiving facsimile (not shown) through an NCU (network control unit) 13 and the telephone line 14. The basic operation of the facsimile 1 is thus performed in transmission.

The operation for receiving, on the other hand, a received signal is demodulated through the NCU 13 and the modem 12, for conversion into a digital signal. The digitized signal is converted into parallel data by the P-S converter 11. Such data are temporarily stored in the transmission memory 10, and supplied to the matrix conversion circuit 9 upon storage of data by 2 kilobytes, for example. The data converted by the matrix conversion circuit 9 are sequentially stored in the buffer memory 8.

The buffer memory 8, which is implemented by a thermal head or the like, supplies data to a parallel-to-serial converter (hereinafter referred to as "P-S converter") 16 for converting the data into serial data upon storage of the data in correspondence to a single scanning by a recording head 15 for recording in the serial system, i.e., a single movement in a main scanning direction for scanning along the G3 standard. The serialized data are supplied to the recording head 15, which in turn performs the recording on a recording paper 17 on the basis of the supplied data. The buffer memory 8 receives subsequent data during data output operation. Thus, the capacity for double scanning operation of the photoelectric conversion element 4/recording head 15 is required by the buffer memory 8.

Figure 2A:
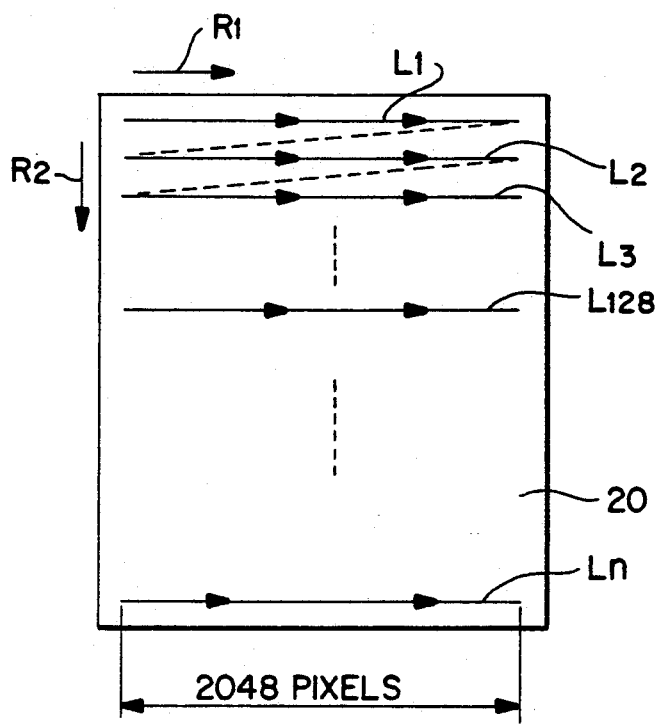
FIG. 2A is a diagram for illustrating a conventional scanning method along the G3 standard.
Figure 2B:
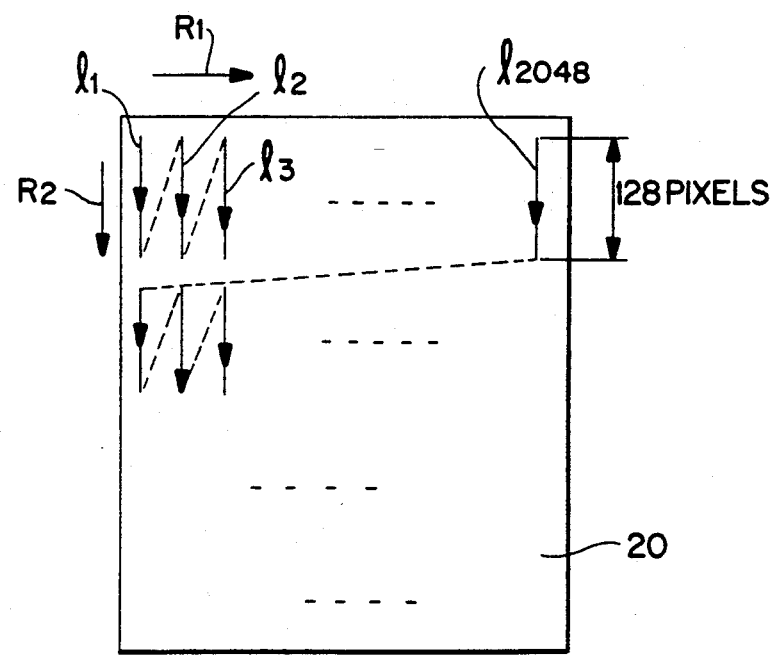
FIG. 2B is a diagram for illustrating scanning performed by the facsimile according to the embodiment of the present invention.

FIG. 2A illustrates a conventional method of scanning an original 20 in size 4 of series B (hereinafter referred to as "B-4 size") of Japanese Industrial Standards along the G3 standard, and FIG. 2B shows the scanning performed in the facsimile 1 according to the embodiment of the present invention. Referring to FIG. 2A, the main scanning is performed along an arrow R1 and the subscanning is performed along an arrow R2 in the G3 standard. Scanning expressed by n scanning lines L1, L2, ..., L128, ..., Ln is thus performed to read or record the original 20. With respect to the original 20 of the B-4 size, for example, one scanning line corresponds to 2048 pixels, and image data corresponding to one scanning line is expressed by data of 2048 bits.

Referring to FIG. 2B, 128 pixels are read along an arrow R2, and a similar reading operation is sequentially performed along an arrow R1 in the facsimile 1. With respect to the original 20 of the B-4 size, scanning expressed by 2048 scanning lines l1, l2, ..., l2048 is first performed and then similar scanning is performed with slippage by the 128 pixels along the arrow R2. Such scanning is sequentially performed to read the original 20. Also, similar scanning is performed when recording. Thus, the photoelectric conversion element 4 or the recording head 15 makes a single movement from an upstream end of the original 20 along the arrow R1 to a downstream end (such movement is hereinafter referred to as "single scanning"). Thereby image information corresponding to the scanning lines L1 to L128 shown in FIG. 2A. In the facsimile 1, image information stored in the buffer memory 8 for the transmission is stored in an order expressed by the scanning lines shown in FIG. 2B. This order must be converted into the order expressed by the scanning lines shown in FIG. 2A. A conversion opposite to the above conversion is required for receiving. A description is now made on such a data conversion performed by the facsimile 1.

Figure 3B:
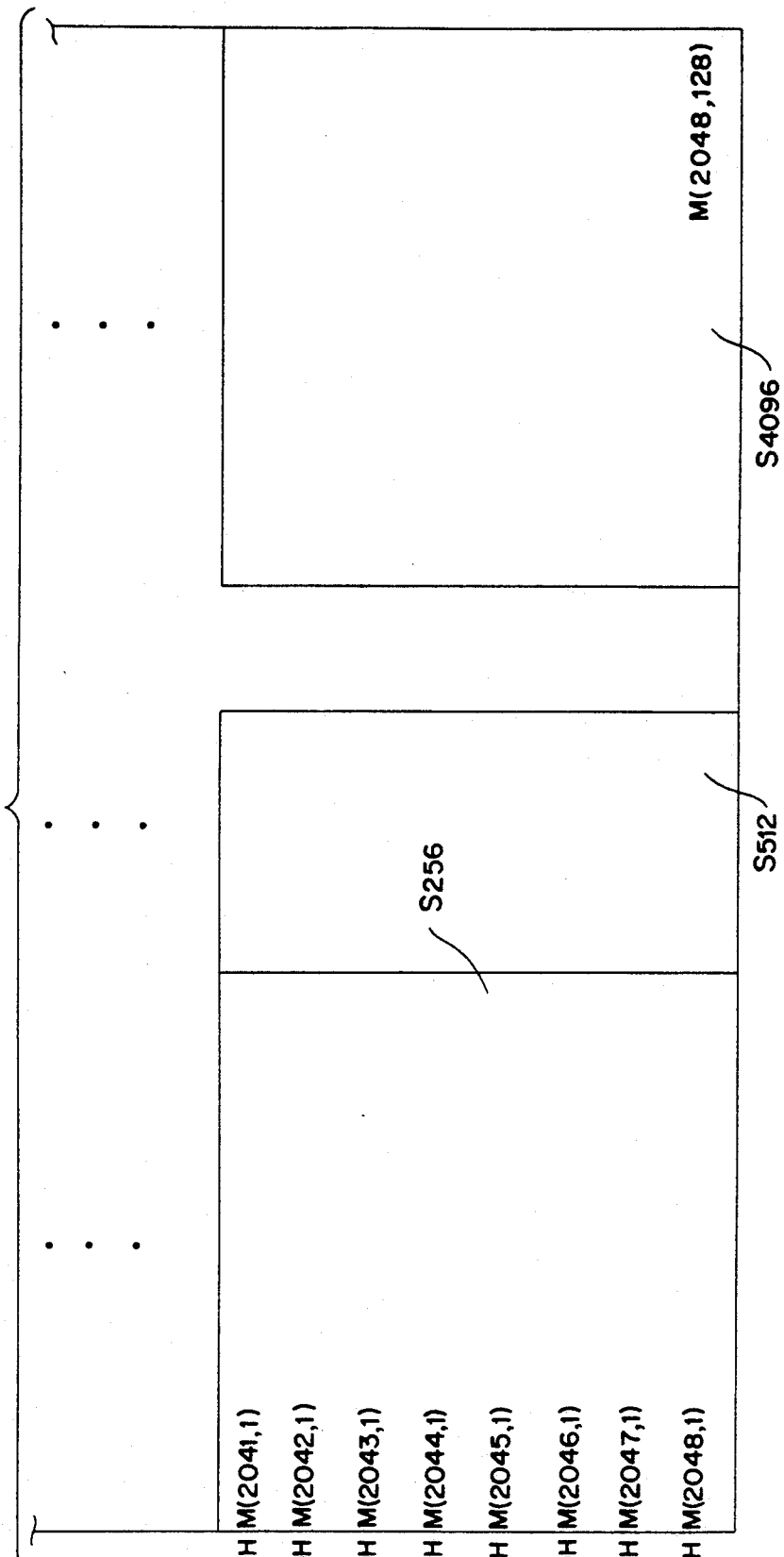
FIGS. 3A and 3B are a diagram for illustrating a mode of storage in a buffer memory shown in FIG. 1.
Figure 3A:
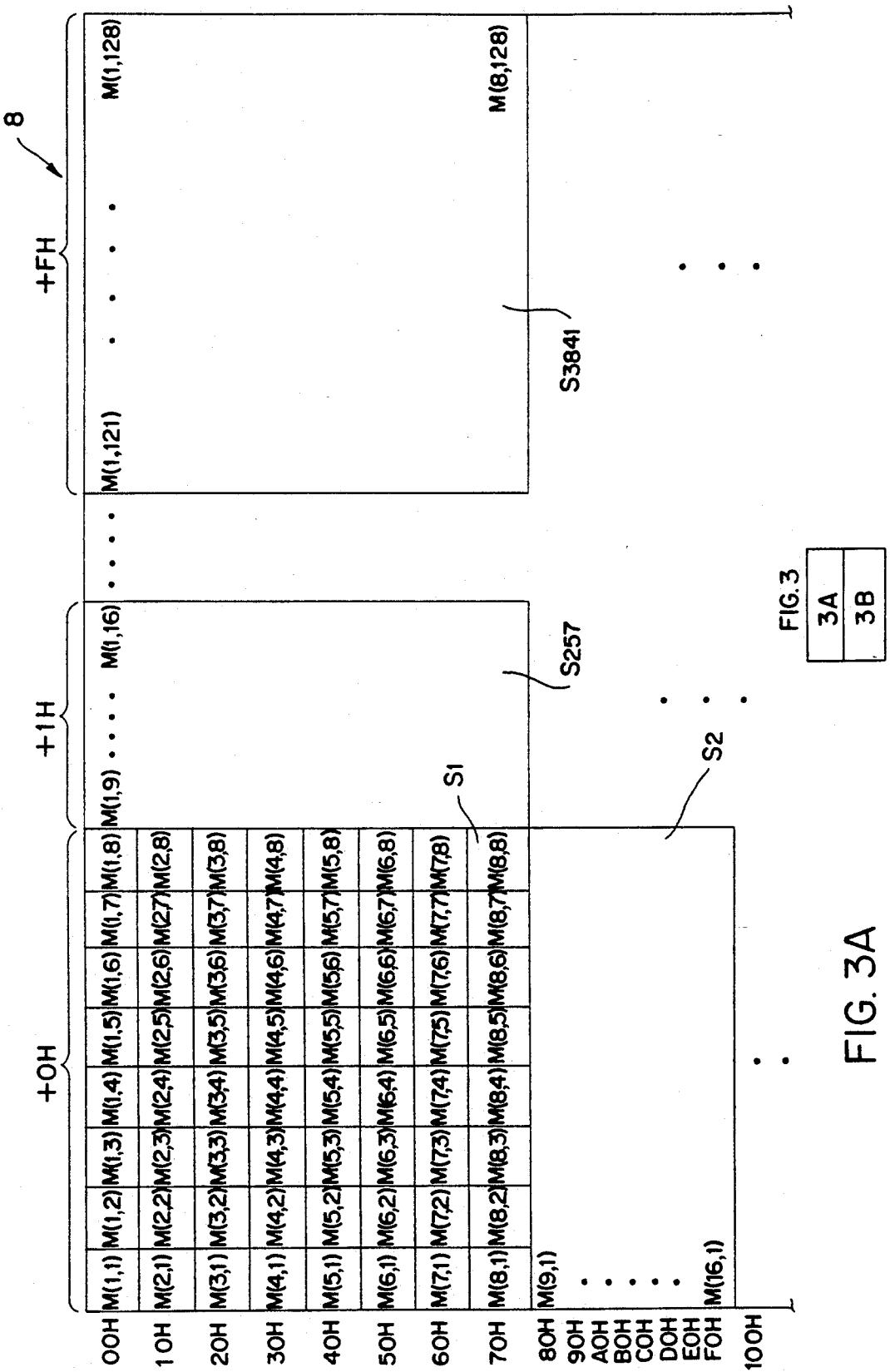

FIG. 3 shows a memory map of the buffer memory 8. Although the buffer memory 8 requires a capacity for the double scanning operation of:

$$128 \times 2048 \times 2 = 512k \text{ bits} \tag{1}$$

as hereinabove described, the map has only storage areas for 256k bits as shown in FIG. 3. While the data of 256k bits are being converted, subsequent image data are inputted in the storage areas for the remaining 256k bits.

The buffer memory 8 is assigned with addresses 000H, 001H, ..., 7FFFH (H: hexadecimal number) per byte, so that image data corresponding to the scanning line l1 as shown in FIG. 2, are stored in the 16-byte storage areas for addresses 000H to 00FH. The addresses corresponding to the scanning line l2 are stored in the storage areas of the addresses 010H to 01FH, ... and the addresses corresponding to the scanning line l2048 are stored in the storage areas of the addresses 7FF0H to 7FFFH respectively, for example In this embodiment, image data are processed in units of eight bytes. The 8-byte image data are those stored in a unit area S1 formed by the addresses 000H, 010H, 020H, 030H, 040H, 050H, 060H and 070H, a unit area S2 formed by the addresses 080H, 090H, 0A0H, 0B0H, 0C0H, 0D0H, 0E0H and 0F0H, . . . , a unit area S256 formed by the addresses 7F80H, 7F90H, 7FA0H, 7FB0H, 7FC0H, 7FD0H, 7FE0H and 7FF0H, a unit area S257 formed by the addresses 001H, 011H, 021H, 031H, 041H, 051H, 061H and 071H, . . . and a unit area S4096 formed by the addresses 7F8FH, 7F9FH, 7FAFH, 7FBFH, 7FCFH, 7FDFH, 7FEFH and 7FFFH respectively.

For the convenience of illustration, the data stored in the entire buffer memory 8 are expressed in the form of a matrix. The data per bit is expressed as data $M(i, j)$ (i and j represent integers such that $1 \leq i \leq 2048$ and $1 \leq j \leq 128$). Thus, image data of data $M(1, 1)$ to $M(1, 8)$ are stored in the address 000H, for example. Data corresponding to the scanning line l1 are expressed as data $M(1, j)$ ($1 \leq j \leq 128$) and data corresponding to the scanning line L1 are expressed as data $M(i, 1)$ ($1 \leq i \leq 2048$).

The buffer memory 8 stores the image data in the order expressed by the scanning lines shown in FIG. 2B. In order to fetch the data in the order expressed by the scanning lines as shown in FIG. 2A, for example, the image data of the unit areas S1, S2, ..., S256 may be fetched in this order to transpose rows and columns of a matrix formed by the data $M(i, j)$ that is stored in the respective unit areas, for storing the same data in the transmission memory 10.

FIG. 4 illustrates exemplary image data thus processed and stored in the transmission memory 10. The storage mode shown in FIG. 4 is implemented as follows: first, the CPU 7 addresses the buffer memory 8, to fetch the unit area S1; then, the CPU 7 supplies the data $M(1, 1), \ldots, M(1, 8), M(2, 1) \ldots, M(2, 8)$ and $M(3, 1), \ldots, M(8, 8)$ to the matrix conversion circuit 9, to transpose the rows and columns; thereafter, the CPU 7 addresses the transmission memory 10 to write the data byte by byte in the addresses 000H, 100H, 200H, . . . , 700H of the transmission memory 10. In other words, data $M(1, 1), M(2, 1), M(3, 1), M(4, 1), \ldots, M(8, 1)$ are written in the address 000H, the data $M(1, 2), M(2, 2), M(3, 2), \ldots, M(8, 2)$ are written in the address 100H, . . . , and the data $M(1, 8), M(2, 8), \ldots, M(8, 8)$ are written in the address 700H.

Similar processing is performed for the unit areas S2 to S256, for storing the image data in the transmission memory 10, as shown in FIG. 4. In this state, the data are read from the transmission memory 10 byte by byte along the addresses, for sequentially retrieving the data $M(i, 1)$ ($1 \leq i \leq 2048$) corresponding to the scanning line L1, the data $M(i, 2)$ ($1 \leq i \leq 2048$) corresponding to the scanning line L2, ..., and the data $M(i, 8)$ ($1 \leq i \leq 2048$) corresponding to the scanning line L8. Similar processing is performed over the unit areas S257 to S4096, and the entire image data are converted into an arrangement corresponding to the G3 standard.

Figure 5:
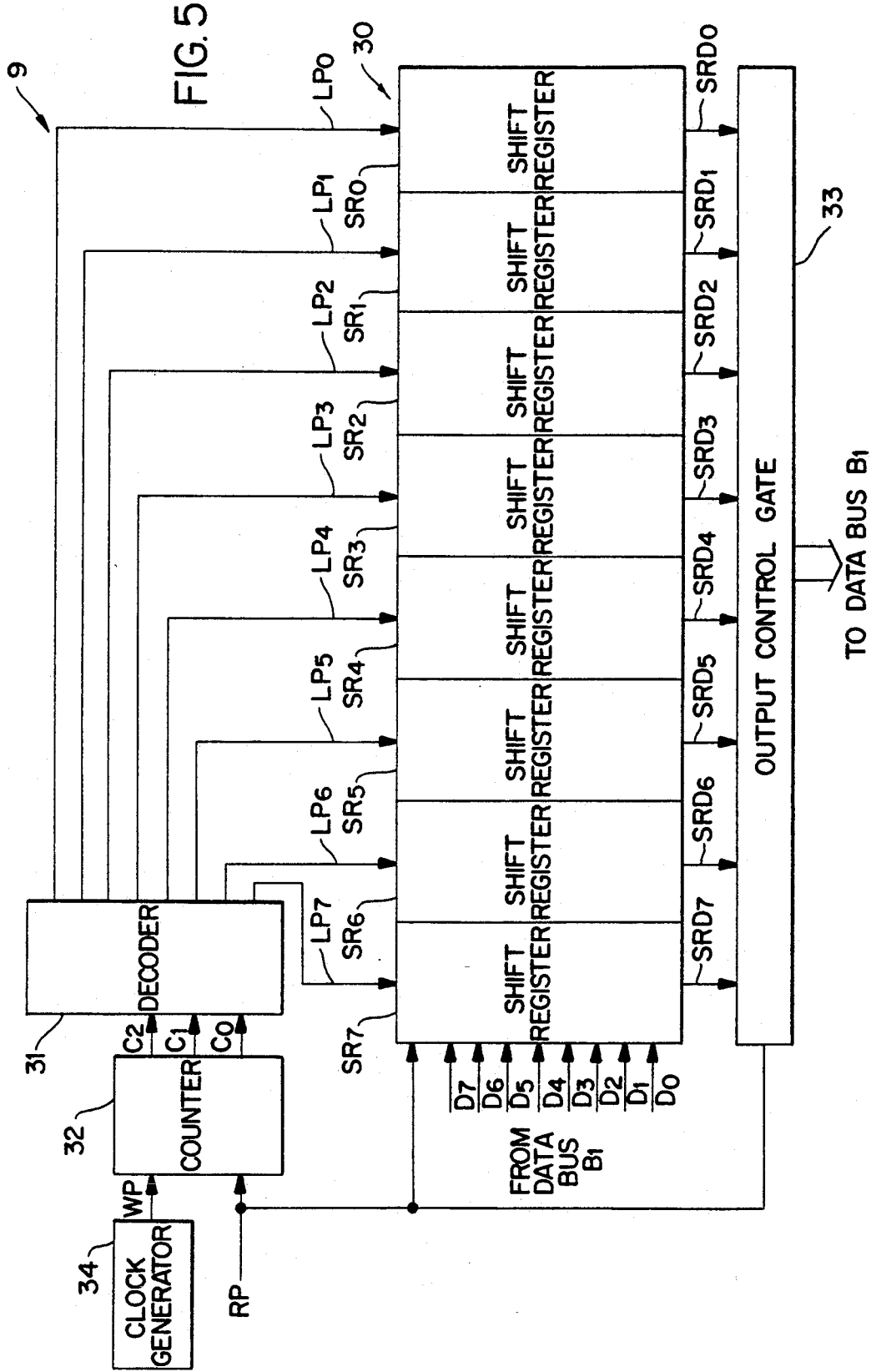
FIG. 5 is a block diagram showing basic structure of a matrix conversion circuit.

FIG. 5 is a block diagram showing basic structure of the matrix conversion circuit 9 which implements the aforementioned matrix conversion. In transmission, image data stored in the buffer memory 8 are supplied from the data bus B1 to a shift register group 30 formed by shift registers SR0 to SR7, which are storage transmission means, through lines D0 to D7 in an 8-bit parallel manner. All of the shift registers SR0 to SR7 are 8-bit shift registers. A decoder 31 supplies the shift registers SR0 to SR7 with loading pulses, which are input signals, through lines LP0 to LP7 respectively. Upon such a supply of the loading pulses, the shift registers SR0 to SR7 input the image data from the data bus B1 through the lines D0 to D7.

A 3-bit counter 32 for counting basic clock signals WP generated from a clock generator 34 supplies a count value to the decoder 31 in a 3-bit parallel manner through lines C2, C1 and C0. The decoder 31 outputs a loading pulse to any one of the lines LP0 to LP7 in response to the supplied count value. The counter 32 receives the basic clock signals WP and the reading pulses RP which serves as reset signals.

The shift registers SR0 to SR7 respectively supply leas significant bit data to an output control gate 33 through lines SRD0 to SRD7. The output control gate 33 is supplied with the reading pulses RP, while the image data are simultaneously supplied to the transmission memory 10 in an 8-bit parallel manner through the data bus B1.

The aforementioned reading pulses RP are supplied to the shift register group 30 as transfer signals, so that respective internal data of the shift registers SR0 to SR7 are shifted in a bit wise manner from the most significant bits toward the least significant bits.

Figure 6A:
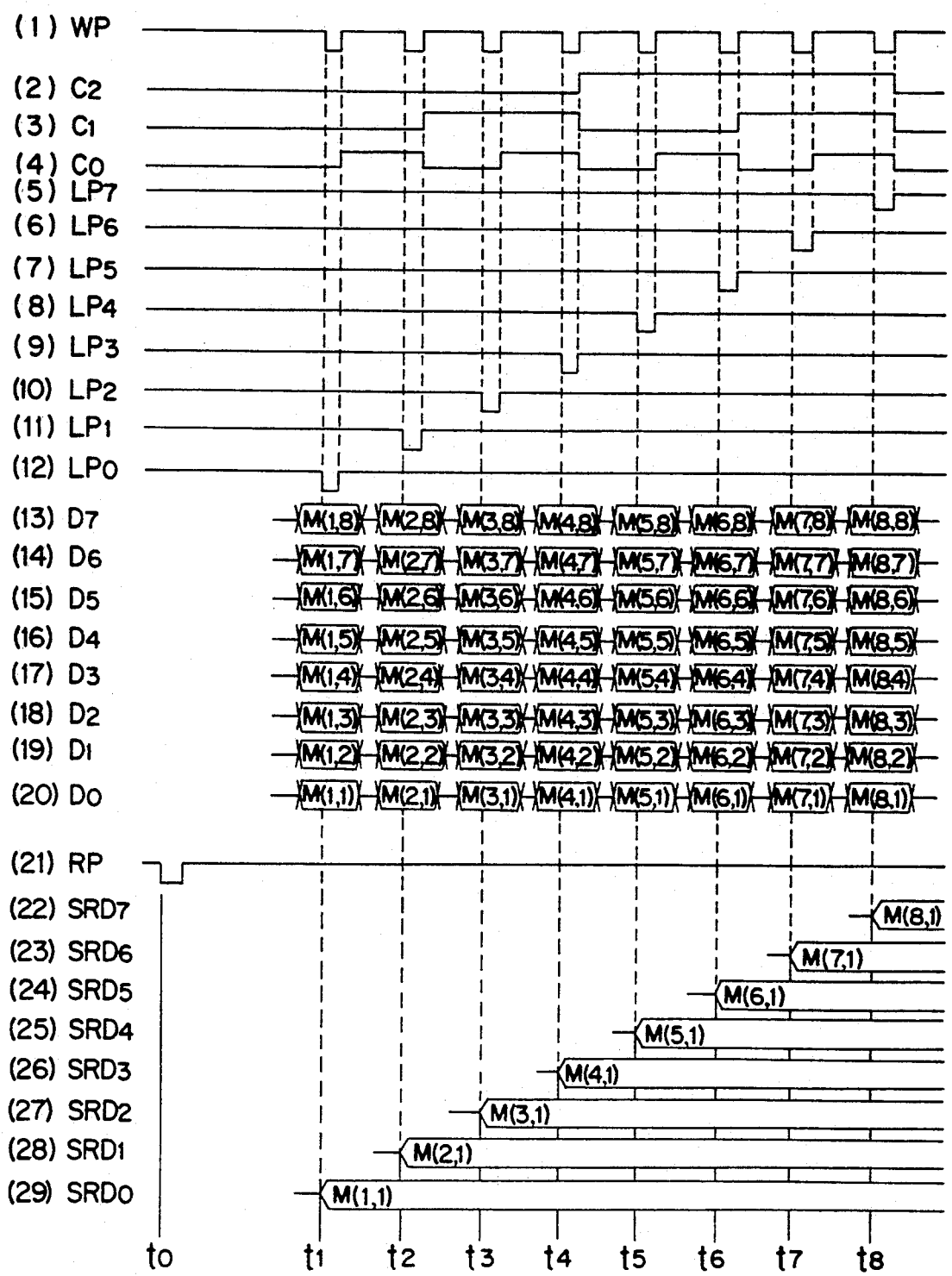
FIG. 6 is a timing chart for illustrating the operation of the matrix conversion circuit.
Figure 6B:
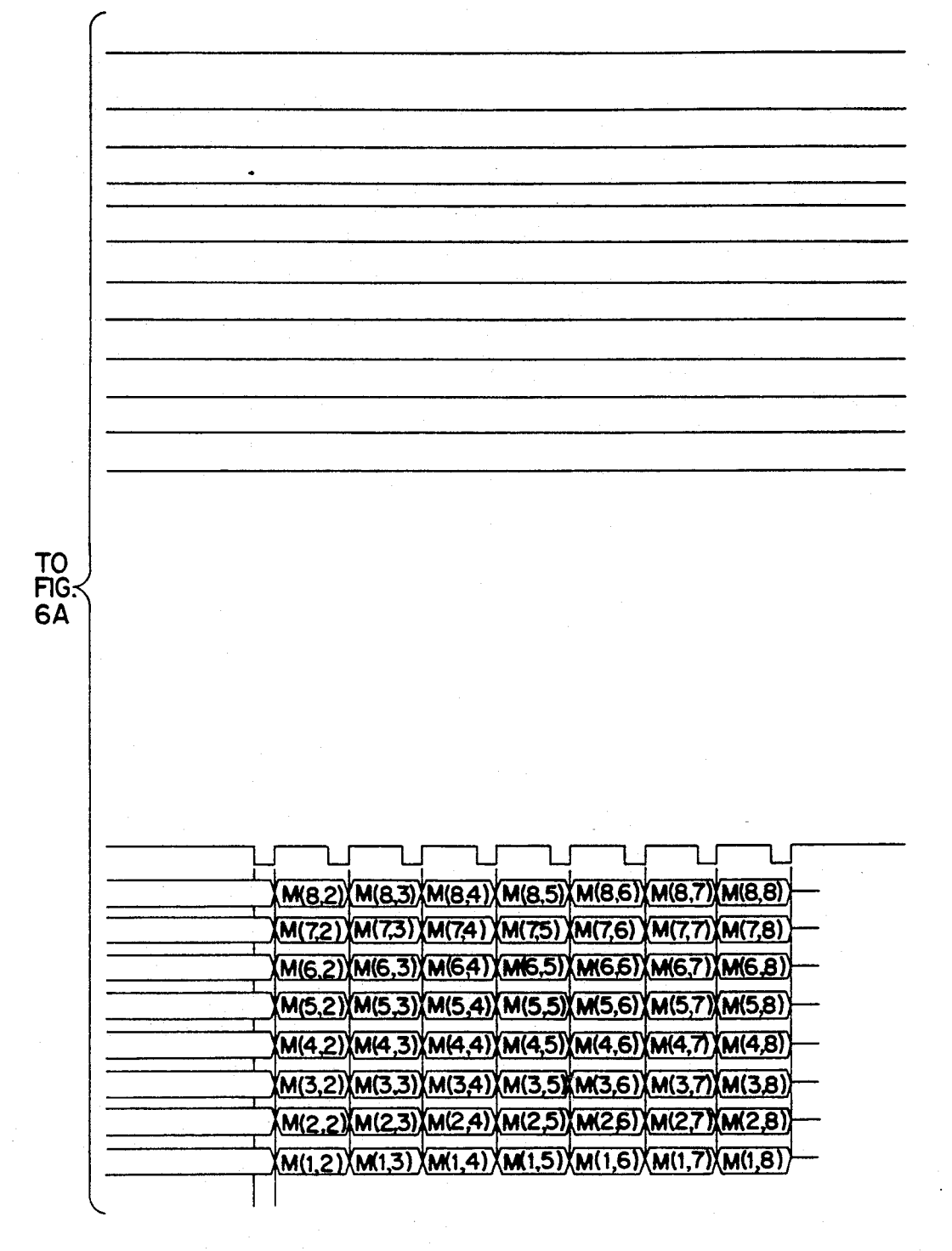

FIG. 6 is a timing chart for illustrating the operation of the matrix conversion circuit 9. Referring to FIG. 6, numeral (1) indicates the basic clock signal WP and numerals (2) to (4) indicate signals derived on the lines C2 to C0 respectively. Numerals (5) to (12) indicate signals derived on the lines LP7 to LP0 respectively and numerals (13) to (20) indicate signals corresponding to data supplied to the shift register group 30. Numeral (21) indicates the reading pulses RP and numerals (22) to (29) indicate signals corresponding to data derived on the lines SRD0 to SRD7.

The line C0 corresponds to the least significant bit of the counter 32, and the line C2 corresponds to the most significant bit. The signal derived on the line C0 is inverted on a leading edge of the basic clock signal WP, the signal derived on the line C1 is inverted on a trailing edge of the signal derived on the line C0, the signal derived on the line C2 is inverted on a trailing edge of the signal derived on the line C1.

As to the signals derived on the lines C0 to C2, a low level is expressed as "0" and a high level is expressed as "1" while the line C0 is allotted to the least significant bit for expressing count values in binary numbers having a decimal notation of k. The decoder 31 derives the loading pulse on a line LPk in synchronization with the basic clock signal WP. Thus, the signals (5) to (12) shown in FIG. 6 are derived on the lines LP0 to LP7.

Such cases are considered where the data in the unit area S1 of the buffer memory 8 are inputted in the shift register group 30 through the lines D0 to D7. The data from the unit area S1 are parallelly derived on the lines D0 to D7 in order of the addresses 000H, 010H, 020H, 030H, 040H, 050H, 060H and 070H. The line D0 corresponds to the least significant bit and the line D7 corresponds to the most significant bit. Thus, the signals corresponding to the data (13) to (20) in FIG. 6 are derived on the lines D0 to D7.

At a time t0, the reading pulse RP is generated to reset the counter 32. The basic clock signal WP is inputted at a time t1, when the count value of the counter 32 is zero. Thereby, the decoder 31 outputs the loading pulse to the line LP0, and the 8-bit data currently derived on the lines D0 to D7 are stored in the shift register SR0. Namely, the data M(1, 1), M(1, 2), ..., M(1, 8) are stored in the shift register SR0, and the least significant bit data M(1, 1) is derived on the line SRD0.

At a time t2, the count value of the counter 32 is 1 and hence the loading pulse is derived on the line LP1, whereby the data M(2, 1), ..., M(2, 8) derived on the lines D0 to D7 are stored in the shift register SR1. In a similar manner, the data M(3, 1), ..., M(3, 8), M(4, 1), ..., M(4, 8), M(5, 1), ..., M(5, 8), M(6, 1), ..., M(6, 8), M(7, 1), ..., M(7, 8) and M(8, 1), ..., M(8, 8) are stored in the shift registers SR2, SR3, SR4, SR5, SR6 and SR7 respectively at times t3, t4, t5, t6, t7 and t8.

When the reading pulse RP falls to a low level at a time t9, the output control gate 33 synchronously outputs the data M(1, 1), M(2, 1), ..., M(8, 1) to the data bus B1. When the next reading pulse RP rises at a time t10, the shift registers SR0 to SR7 synchronously shift the respective internal data in a bit wise manner from the most significant bits toward the least significant bits. Thus, the signals corresponding to the data M(1, 2), M(2, 2), M(3, 2), ..., M(8, 2) are derived on the lines SDR0 to SDR7 respectively. Thereafter, in a similar manner, data reading is performed when the reading pulses RP are at low levels while data shifting is performed in the shift registers SR0 to SR7 on leading edges of the reading pulses RP. Thereby rows and columns are transposed with respect to the data M(i, j) ($1 \leq i \leq 8$, $1 \leq j \leq 8$) in the unit area S1. The data which are matrix-converted, are stored in the transmission memory 10 as shown in FIG. 4.

In the receiving operation, the transmission memory 10 supplies data to the lines D0 to D7 for performing a similar matrix conversion, so that the image data are inputted in the buffer memory 8 with an address assignment.

FIG. 7 illustrates signals derived on respective parts of the facsimile 1 in the transmission. FIG. 7(1) shows an output signal from the photoelectric conversion element 4 and FIG. 7(2) shows an output from the binarizing circuit 6, while FIG. 7(3) shows an output from the P-S converter 11. Referring to FIG. 7(2) and FIG. 7(3), signal parts corresponding to the data M(i, j) ($1 \leq i \leq 2048$, $1 \leq j \leq 128$) of the buffer memory 8 are indicated with symbol m(i, j). The photoelectric conversion element 4 outputs a signal expressed in a period W1 shown in FIG. 7(1) to the scanning line l1 shown in FIG. 2B. In a similar manner, signals expressed in periods W2, ..., W2048 are outputted to the scanning lines l2, ..., l2048. Between the periods W1, ..., W2048, no signals are outputted intermittently in retrace intervals Δ.

Referring to FIG. 7(2) and FIG. 7(3), a high level corresponds to a black pixel and a low level corresponds to a white pixel. Output signals from the binarizing circuit 5 corresponds to a data order of M(1, 1), M(1, 2), ..., M(1, 128), M(2, 1), ..., M(2, 128), ..., M(2048, 1), ..., M(2048, 128). The data of the respective pixels read in such an order are outputted in a data order of M(1, 1), M(2, 1), M(3, 1), ..., M(2048, 1), M(1, 2), ..., M(2048, 2), M(1, 128), ..., M(2048, 128) in the P-S converter 11, as shown in FIG. 7(3).

As hereinabove described, the data taken in the buffer memory 8 in the transmission are subjected to conversion a for each of the 8-byte unit areas S1, S2, ..., S4096 according to this embodiment. First, the CPU 7 addresses the buffer memory 8 to retrieve the unit area S1 from the buffer memory 8 so that the matrix conversion circuit 9 performs a matrix conversion of the data M(i, j) ($1 \leq i \leq 8$, $1 \leq j \leq 8$) in the unit area S1, and the CPU 7 addresses the transmission memory 10 to sequentially input the data in the addresses 000H, 100H, ..., 200H of the transmission memory 10. Then the CPU 7 retrieves the unit area S2 and performs matrix conversion to sequentially input the data in the addresses 001H, 101H, ..., 701H of the transmission memory 10. Similar processing is performed on the data in the unit areas S3 to S256 for inputting the same data in the transmission memory 10, whereby the data corresponding to the lines L1 to L8 in FIG. 2A are stored in the transmission memory 10. In this state, the data in the transmission memory 10 are read along the addresses, for performing data transmission responsive to the G3 standard. Such processing is performed on the unit areas S257 to S512, ..., S3841 to S4096, to transmit image information for a single scanning of the original image in order along the G3 standard. Similar processing is performed over the entire original surface, for transmitting image information on the entire original image.

When receiving, image data for eight scanning lines of the G3 standard are stored in the transmission memory 10. Thereafter, the addresses 000H, 100H, ..., 700H of the transmission memory 10 are specified to retrieve 8-byte data of these areas and input the same data in the matrix conversion circuit 9 to perform a matrix conversion. Further, the addresses 000H, 010H, ..., 070H of the buffer memory 8 are specified to store the data. Then the addresses 001H, 101H, ..., 701H of the transmission memory 10 are specified to perform a matrix conversion, and the addresses 080H, 090H, ..., 0F0H of the buffer memory 8 are specified to store the data.

Similar processing is performed to the 8-byte data in the addresses 0FFH, 1FFH, ..., 7FFH of the transmission memory 10, to completely input the data corresponding to the scanning lines L1 to L8 as shown in FIG. 2A. When data for the subsequent eight scanning lines are stored in the transmission memory 10, the data are processed similarly to the above described manner for storing in the unit areas S257 to S512 of the buffer memory 8. The data are similarly stored in the unit areas S3841 to S4096, for completing the storage of data for one scanning line.

Thereafter, the data in the buffer memory 8 are retrieved along the addresses to be converted into serial signals by the P-S converter 16 to be subjected to scanning by the recording head 15 as shown in FIG. 2B to start the recording. During such a recording, the data from the transmission memory 10 are being inputted in areas other than the areas which are currently subjected to data reading.

In the above processing, the CPU 7 addresses the buffer memory 8 and the transmission memory 10 performs data transfer in units of eight bits, whereby the processing can be maintained sufficiently at a high speed. Through an experiment made by the inventor, it has been confirmed that the processing time per scanning is about 41 msec. when an address assignment is performed by the CPU 7 which is implemented by Z80. A single scanning corresponds to eight scanning lines in the G3 standard. Thus, it is understood that an extremely fast processing time enabled with the processing time being about 5 msec. per scanning lines. Further, processing other than a matrix conversion is performed in the so-called software manner by the CPU 7, to readily cope with a variation in original size and the number of pixels of the reading sensor and the recording head of a counter facsimile. In addition, the matrix conversion circuit 9, having a simple and small scale circuit structure, can be easily integrated into the circuit.

Although the matrix conversion is performed in units of eight bits in the above embodiment, such an operation may be performed in units of 16 bits × 16 = 32 bytes, example. In this case, image data are processed in units of 16 bits.

According to the present invention as hereinabove described, transposition/arithmetic processing of data having a matrix arrangement stored in a plurality of storage/transfer devices is performed at a high speed. Thus, the processing speed for data conversion is significantly improved, while data conversion can be implemented with a small scale circuit structure.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data converter for converting data, comprising
   a plurality of storage/transfer means, each including a plurality of bits of storage capacity, for receiving parallel input of a plurality of bits of data corresponding to previously vertically scanned image columns, in response to read signals and for internally sequentially transferring storage contents bit by bit through each of the plurality of storage/transfer means in response to transfer signals; and
   output means, operatively connected to said storage/transfer means, for parallel outputting of a plurality of bits of data read from said storage/transfer means in response to said transfer signals, each parallel output of bits corresponding to image rows.

2. The data converter as claimed in claim 1, further comprising:
   clock pulse generating means for generating clock pulses;
   counter means, operatively connected to clock pulse generating means, for counting said clock pulses outputted from said clock pulse generating means; and
   decoder means, operatively connected to said counter means, for decoding the output from said counter means and for supplying a plurality of input signals to said storage/transfer means.

3. An image reading using a data converter, comprising:
   image reading means provided with a plurality of sensors arranged in a vertical direction for sequentially scanning a surface of an original along said vertical direction and thereafter being moved in a horizontal direction for performing sequential scanning along said vertical direction again, thereby sequentially outputting a plurality of bits of image read data every vertical scan;
   a plurality of storage/transfer means, operatively connected to said image reading means, each including a plurality of bits of storage capacity, for receiving parallel input of said plurality of bits of image read data, corresponding to previously vertically scanned image columns outputted from said image reading means in response to read signals and internally sequentially transferring storage contents bit by bit through each of the plurality of storage/transfer means in response to transfer signals; and
   output means, operatively connected to said storage/transfer means, for parallel outputting of a plurality of bits of data read from said storage/transfer means in response to said transfer signals, each parallel output of bits corresponding to image rows.

4. The image reader as claimed in claim 3, further comprising:
   clock pulse generating means for generating clock pulses;
   counter means, operatively connected to said clock pulse generating means, for counting said clock pulses outputted from said clock pulse generating means; and
   decoder means, operatively connected to said counter means, for decoding output form said counter means and for supplying a plurality of input signals to said storage/transfer means.

5. An image reading apparatus for scanning an image in a vertical direction and subscanning in a horizontal direction, comprising:
   image data generating means for generating serial analog data representing a column of the image during each of a plurality of sequential vertical scans and for converting said serial analog data into parallel digital data;
   buffer memory means, operatively connected to said image data generating means, for sequentially temporarily storing said parallel digital data in a matrix of rows and columns, one row corresponding to each of the plurality of vertical scans;
   matrix conversion means, operatively connected to said buffer memory means, for sequentially receiving a plurality of parallel digital data, corresponding to stored columns of said buffer memory means and for converting and outputting said plurality of columns of parallel digital data into a plurality of rows parallel digital data; and
   memory means, operatively connected o said matrix conversion means, for storing said plurality of parallel data output from said matrix conversion means in sequential rows, each sequential row corresponding to a row of the original image.

6. The image reading apparatus as claimed in claim 5 wherein said matrix conversion means comprises:
   clock means for generating clock signals;
   counter means, operatively connected to said clock means, for counting said clock signals and producing a clock signal;
   decoder means, operatively connected to said counter means, for decoding said count signal and producing load signals;
   shift register means, operatively connected to said decoder means and said buffer memory means, for receiving said plurality of parallel digital data from said buffer memory means and producing said plurality of rows of parallel digital data in response to said load signals; and
   output means, operatively connected to said shift register means and said memory means, for receiving said plurality of rows of parallel digital data from said shift register means and outputting said plurality of rows of parallel digital data to said memory means.

7. The image reading apparatus as claimed in claim 5, further comprising:
- parallel to serial conversion means, operatively connected to said memory means, for converting said parallel digital data from said memory means into serial data; and
- modem means, operatively connected to said parallel to serial conversion means, for transmitting said serial data over communication channels.

8. An image reading apparatus for scanning an image in a vertical direction and subscanning the image in a horizontal direction and for converting and subsequently storing the image as an image scanned in a horizontal direction and subscanned in a vertical direction, comprising:
- image data generating means for generating serial analog data representing a column of the image, during each of a plurality of vertical scans and for converting said serial analog data into parallel digital data;
- buffer memory means, operatively connected to said image data generating means, for receiving and temporarily storing said parallel digital data in a matrix of rows and columns, one row corresponding to each of said plurality of vertical scans;
- matrix conversion means, operatively connected to said buffer memory means, for sequentially receiving parallel digital data, said parallel digital data corresponding to columns of parallel digital data sequentially output from said buffer memory means, and for converting and outputting each column of parallel digital data into a row of parallel digital data;
- memory mean, operatively connected to said matrix conversion means, for storing each output row of parallel digital data in sequential rows, each sequential row corresponding to a row of the image and thereby storing the image as an image scanned in a horizontal direction and subscanned in a vertical direction.

9. The image reading apparatus of claim 8, wherein said image data generating means generates plural sets of serial analog data representing each column of the image, each of the plural sets corresponding to a portion of each column, less than each entire column of the image.

10. The image reading apparatus of claim 9, wherein for each portion of a column of the image, for which said image data generating means generates serial analog data and subsequently converts into parallel digital data, said buffer memory means sequentially stores said corresponding parallel digital data in one sequential row representing each column of the image.

11. The image reading apparatus of claim 10, wherein said matrix conversion means converts parallel digital data corresponding to each portion of each column into a row of parallel digital data, and said memory means receives and sequentially stores each output row of parallel digital data thereby storing data corresponding to each row of the image.

12. The image reading apparatus of claim 8, further comprising:
- parallel to serial converting means, operatively connected to the memory means, for converting parallel digital data, output from said memory means, to serial analog data.

13. The image reading apparatus of claim 12, further comprising:
- printing means, operatively connected to said parallel to serial converting means, for receiving serial analog data from said parallel to serial converting means and for printing said received serial analog data.

14. The image reading apparatus of claim 12, further comprising:
- a modem, operatively connected to said parallel to serial converting means, for receiving said serial analog data from said parallel to serial converting means and for transmitting said serial analog data to a subsequent output destination.

15. An image reading method for scanning an image in a vertical direction and subscanning the image in a horizontal direction and for converting and subsequentially storing the image as an image scanned in a horizontal direction and subscanned in a vertical direction, comprising the steps of:
- (a) generating serial analog data representing a column of the image, during each of a plurality of vertical scans and converting said serial analog data into parallel digital data;
- (b) storing said parallel digital data temporarily in a matrix of rows and columns, one row corresponding to each of said plurality of vertical scans;
- (c) receiving, sequentially, columns of parallel digital data, each corresponding to a stored matrix column of parallel digital data and converting and outputting each column of parallel digital data into a row of parallel digital data; and
- (d) storing each output row of parallel digital data in sequential rows, each sequential row corresponding to a row of the image and thereby storing the image as an image scanned in a horizontal direction and subscanned in a vertical direction.

* * * * *